2,767,150

MOLDING COMPOUND OF CASHEW NUT SHELL OIL POLYMER AND CASHEW NUT SHELL AS THE FILLER

Mortimer T. Harvey, South Orange, N. J., assignor to The Harvel Corporation, a corporation of New Jersey No Drawing. Application January 29, 1948,
Serial No. 5,184

2 Claims. (Cl. 260—9)

This invention relates to novel compositions of matter and to methods for making them. In one of its more specific aspects the invention is directed to friction elements, examples of which are brake linings and clutch facings, and to methods for making them.

Prior to this invention, I discovered that friction elements containing derivatives of cashew nut shell liquid as one or more components thereof were far superior to previously known brake linings.

Cashew nut shell liquid may be obtained in a number of different ways and usually by passing the whole cashew nuts through a cashew nut shell liquid bath maintained at about 400° F.–500° F. By maintaining said whole nuts in said bath for a period of 1–5 minutes, about 10%–13% of the cashew nut shell liquid in the raw whole nuts, seeps out of the shells thereof and into the bath. These partially cashew nut shell liquid depleted nuts which are now coated with cashew nut shell liquid on the outer surface thereof may be centrifuged to separate this coating therefrom and to provide comparatively dry nuts which may be cracked manually or by centrifuging against an impact surface whereby the kernels are separated from the shells and then in any desired manner, the kernels are placed in a container and the partially spent shell fragments in another. These partially spent shell fragments are of various sizes and shapes and the major part by weight have a dimension of at least one-eighth of an inch. These shell fragments consist of a tough fibrous material in combination with residual cashew nut shell liquid which may be present by weight in amounts to about 25% of the weight of the shell fragments. Usually, however, the cashew nut shell liquid present in the shell fragments is in the range of 18–22% of the weight of the shell fragments.

Heretofore these shell fragments have in greater part been used as fuel in those plants where the cashew nut shell liquid is recovered from the whole cashew nuts.

In the course of my experimentations with cashew nuts, I have discovered that these shell fragments may be treated or processed in various ways to provide highly useful products, which may serve in a variety of different fields and particularly in the fields of friction elements, floor coverings and the like.

According to this invention the partially spent shell fragments may first be placed in a pressure unit, such as a hydraulic press or an Anderson expeller whereby a portion of the cashew nut shell liquid in the shell fragments is squeezed out and recovered, leaving behind a cake whose cashew nut shell liquid content is no greater than 15% of the weight of the cake and may be as low as about 5% of the weight of the cake depending upon the pressure employed and the period of time and of pressure application.

Still another method which may be employed is to break open the whole nuts while at normal temperatures or in the cold, remove the kernels, and the shell fragments are then thrown into a container in which is caught any of the cashew nut shell liquid which flows out of the fragments. The mass may, with or without removal of the cashew nut shell liquid therein which has separated from the shells, be dumped into a pressure unit, such as an hydraulic press whereby most of the cashew nut shell liquid is squeezed out and recovered leaving behind the resultant cake containing 5–15% by weight of cashew nut shell liquid.

Either of the aforementioned cakes or the fragmentary shells obtained after the hot extraction may be heated to partially or substantially completely decarboxylate the residual cashew nut shell liquid. If desired the decarboxylation may be effected before pressing.

The various cakes as well as the shell fragments obtained after the hot extraction and containing 5–25% by weight of cashew nut shell liquid are preferably comminuted by means of a hammer mill to provide a mass of substantially discrete particles at least 95% of which by weight passes a 10-mesh and in most cases a 20-mesh screen and at least 95% by weight of the mass passing the 10-mesh screen being retained on a 200-mesh screen. If desired, before this comminuting step, the various cakes as well as the shell fragments may first be subjected to a heating step with or without the presence of a condensing agent, either alkaline or acidic, over the requisite period of time to polymerize to the desired degree and intermediate state the residual cashew nut shell liquid contained therein. The comminuted mass consists of small particles of shells coated and/or impregnated with the residual cashew nut shell liquid and this mass will hereinafter be known as Product A.

This Product A either with or without further addition of cashew nut shell liquid may be reacted with an agent containing a reactive methylene group such as hexamethylene tetramine or an aldehyde. When an aldehyde is used, there preferably is employed therewith a condensing agent which may be either alkaline or acidic, such as ammonia, diethyl sulphate, sulphuric acid, hydrochloric acid, etc. The aldehydes preferably employed are formaldehyde, paraformaldehyde, etc. The ratio by weight of said reactive agent to the cashew nut shell liquid is preferably 3–100 to 15–100. The reaction may be carried out at 250° F.–300° F. for 12–24 hours to convert the cashew nut shell liquid constituent to the dry solid state and preferably to its infusible state. This cured product is then comminuted to provide a mass of discrete particles at least 95% of which by weight passes a 20-mesh screen and at least 95% by weight of the particles passing said screen are retained on a 200-mesh screen.

The following Examples 1–6 are given by way of illustrating the manner for producing friction augmenting materials from the various products known as Product A. These examples are given by way of illustration and not limitation, all parts being given by weight.

Example 1

100 parts of Product A is placed in a dough mixer and then there is added thereto 4 parts of paraformaldehyde and 3 parts of diethyl sulfate. The entire mass is agitated until a substantially uniform mixture is obtained. The mixture is then put in shallow pans and cured at a temperature of about 275° F. for a period of 12–24 hours whereupon the residual cashew nut shell liquid in product A has been converted by reaction to the dry, substantially solid, infusible state. The entire mass is removed from the pans and is comminuted by means of a hammer mill to provide a mass of substantially discrete particles at least 95% of which by weight passes a 10-mesh screen, at least 90% passes a 20-mesh screen and at least 95% by weight of the mass which passes said 20-mesh screen is retained on a 200-mesh screen.

Example 2

A similar product is provided by following the same procedure as that set forth in Example 1 except that 10 parts of hexamethylene tetramine is substituted for the paraformaldehyde and diethyl sulfate of Example 1.

Example 3

A similar product is provided by following the same procedure as that set forth in Example 1 except that 15 parts of an aqueous solution of formaldehyde containing 37% of formaldehyde is substituted for the paraformaldehyde of Example 1.

When a quantity of cashew nut shell liquid greater than that present in Product A is desired there may be added thereto cashew nut shell liquid and preferably cashew nut shell liquid which has had the nitrogenous and mineral components removed therefrom and known as treated cashew nut shell liquid whose viscosity is no greater than the raw cashew nut shell liquid from which it was desrived and made in the manner described in the application of S. Caplan executed on January 22, 1948, and bearing Serial No. 4,695, filed January 27, 1948; or the additional cashew nut shell liquid may be prepared in the manner set forth in U. S. Patent 2,067,919 of January 19, 1937, to Harvey et al.; or if desired the treated cashew nut shell liquid may first be at least partially polymerized and may vary from a thin liquid to a heavy viscous liquid.

Example 4

100 parts of treated cashew nut shell liquid, 50 parts of Product A, 8 parts of paraformaldehyde and 2 parts of diethyl sulphate are processed in the manner set forth in Example 1 to provided a product generally similar to that of Example 1.

Example 5

A product similar to that of Example 4 may be obtained by employing the same formulation as that set forth in Example 4 except that 3 parts of a 50% aqueous solution of sodium hydroxide is employed in place of the diethyl sulphate of Example 4.

Example 6

By employing the same procedure as that set forth in the preceding examples, oil modified products may be obtained by adding heat polymerizable oil such as linseed oil, linseed oil residues, China-wood oil, oiticica oil, etc. The following is one of the specific formulations which may be used:

50 parts of treated cashew nut shell liquid
50 parts of a vegetable oil such as bodied linseed oil
50 parts of Product A
8 parts of diethyl sulphate It is preferable that said comminuted products of the type of Examples 1–6 herein be such that the ratio by weight of the shell particles to the resin derived from cashew nut shell liquid and combined therewith be in the range of 1–20 to 7.5–20.

The friction elements may comprise a heat resistant fibrous material, a binder and one or more of the aforesaid friction augmenting materials examples of which are specifically set forth in Examples 1–6. These particles of friction augmenting materials are dispersed as discrete particles as a discontinuous phase in the binder which is the continuous phase. These particles are essentially insoluble in the binder employed. The binder may be a wide variety of compositions such as phenol-aldehyde resin, oil modified phenol-aldehyde resin and other types of binder which preferably in its ultimate state of cure, is in the infusible condition. The binders which I prefer to employ are the infusible phenol-aldehyde resins. Among some of the phenols which may be employed for the production of the binder are hydroxy benzene, cresylic acid, meta para cresol, or any phenol or mixture of two or more of them which upon reaction with an agent containing a reactive methylene group such as an aldehyde, examples of which are acetaldehyde, furfuraldehyde, formaldehyde, paraformaldehyde, paraldehyde or the like, or hexamethylene tetramine will produce a resin which is infusible in its ultimate state of cure and will not dissolve the friction augmenting particles. Instead of using a phenol-aldehyde resin as a binder, there may be used for this purpose a polymerizable drying fatty oil such as China wood oil, linseed oil, oiticica oil, perilla oil, or the like with or without resin modification.

In the production of friction elements a wide variety of materials may be employed with the main combination of a heat resistant fibrous material, binder and friction augmenting particles. In general, a brake lining may be produced by first forming an intimate and substantially uniform mixture of the following components, preferably in the stated proportions, all parts being by weight:

3–20 parts of any one or a mixture of two or more of the comminuted end products of Examples 1–6
15–30 parts of a binder and preferably a phenol-aldehyde or an oil modified phenol-aldehyde resin in its thermosetting heat reactive state
30–50 parts of a heat resistant fibrous material and preferably asbestos in its fibrous condition.

Other ingredients such as sulfur, carbon black, charcoal, graphite, barytes, zinc oxide, etc. may be added if desired depending upon the particular type of friction element required.

In preparing the mixture I prefer that the binder in its intermediate state be in such comminuted form that most, if not all of it will pass a 100-mesh screen. After the mixture is prepared and is in a substantially uniform state of distribution it may be pressed, extruded or sheeted through rolls and shaped at such elevated temperatures that the binder is fused at least in part to obtain a partial setting of the components relative to each other. Then the mass is baked in an oven at elevated temperatures over an extended period of time until substantially all of the binder has been converted to its ultimate state of cure thus rendering it substantially infusible. In the course of said mixing, shaping, partial setting and final curing steps the particles of Examples 1–6 will not have dissolved in the binder. The friction elements or brake linings so produced comprise essentially a heat resistant fibrous material, a substantially infusible binder of polymerized organic material having distributed therethrough discrete particles made in accordance with Examples 1–6.

While the invention has been described in detail it is not to be limited thereby because it is subject to various changes and modifications.

Having thus described my invention what I claim is:

1. A molding compound, comprising cashew nut shell as the filler and the resinous material comprising the naturally occurring oils of the cashew nut shell reacted in situ to an intermediate stage of polymeric growth.

2. The molding compound as claimed in claim 1, wherein the resinous material formed by the reacted cashew nut shell oils is characterized by thermosetting properties.

References Cited in the file of this patent

UNITED STATES PATENTS 2,256,646     Kuzmick et al. _____ Sept. 23, 1941

OTHER REFERENCES

Original specification attached to Canadian Patent 412,373 dated May 11, 1943. Received in P. O. Library Nov. 23, 1945, 11 pages.